H. M. MOLDER.

MOLD MAKING MACHINE.

APPLICATION FILED OCT. 7, 1909.

Reissued Mar. 22, 1910.

13,097.

2 SHEETS—SHEET 1.

Witnesses:

Robert M. Sue

Jno. F. Oberlin

Inventor:

Henry M. Molder by

J. Q. Fay

Attorney.

H. M. MOLDER.

MOLD MAKING MACHINE.

APPLICATION FILED OCT. 7, 1909.

Reissued Mar. 22, 1910

13,097.

2 SHEETS—SHEET 2.

Witnesses:

Robert M. Sze

Jno. F. Oberlin

Inventor:

Henry M. Molder by

J. S. Fay

Attorney.

UNITED STATES PATENT OFFICE.

HENRY M. MOLDER, OF BEDFORD, OHIO, ASSIGNOR TO THE OSBORN MANUFACTURING COMPANY, OF CLEVELAND, OHIO, A CORPORATION OF OHIO.

MOLD-MAKING MACHINE.

13,097. Specification of Reissued Letters Patent. Reissued Mar. 22, 1910.

Original No. 890,919, dated June 16, 1908, Serial No. 390,226. Application for reissue filed October 7, 1909. Serial No. 521,636.

*To all whom it may concern:*

Be it known that I, HENRY M. MOLDER, a citizen of the United States of America, residing at Bedford, in the county of Cuyahoga and State of Ohio, have invented certain new and useful Improvements in Mold-Making Machines; and I hereby declare the following to be a full, clear, and exact description of the invention, such as will enable others skilled in the art to which it pertains to make and use the same.

This invention relates to improvements in mold-making machines, and pertains more especially to improvements in what is known in the art as a "rock-over" mold-making machine.

The primary object of this invention is to make molds with facility by a machine of the character indicated without liability of injuring the mold during the separation of the mold and pattern.

Another object is to swing the connected mold and pattern into a horizontal position onto laterally spaced upwardly projecting depressible pins or members and to hold the latter normally in position to be depressed during the said movement of the mold by the mold-bottom against the action of means acting to retain the said depressible members in their upper and normal position so as to accommodate any unevenness or irregularities in the under side of the mold-bottom, and then to lock the said depressible members in their depressed position preparatory to the separation of the mold and pattern.

Another object is to lower the mold vertically from the pattern and thereby permit the mold to be removed from the aforesaid depressible members when the latter have been depressed by the mold-bottom and locked in their depressed position.

With these objects in view, and to the end of realizing other advantages hereinafter appearing, this invention consists in certain features of construction, and combinations of parts, hereinafter described, pointed out in the claims, and illustrated in the accompanying drawings.

Figure 1:
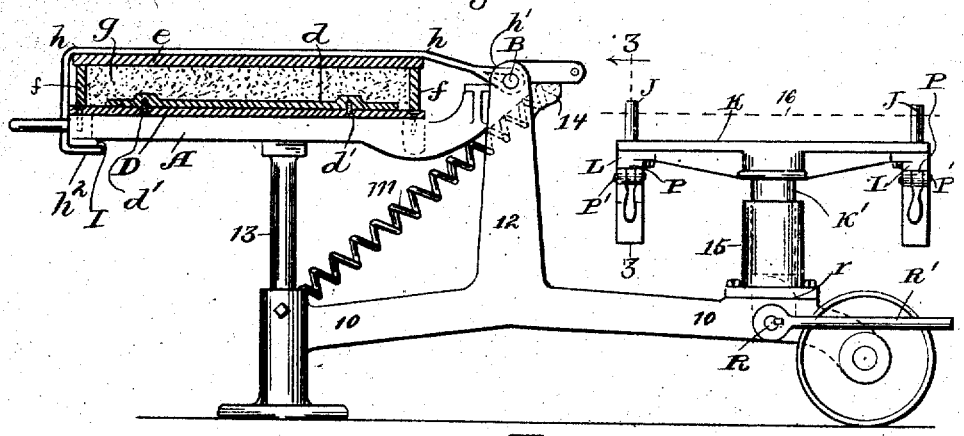
Figure 2:
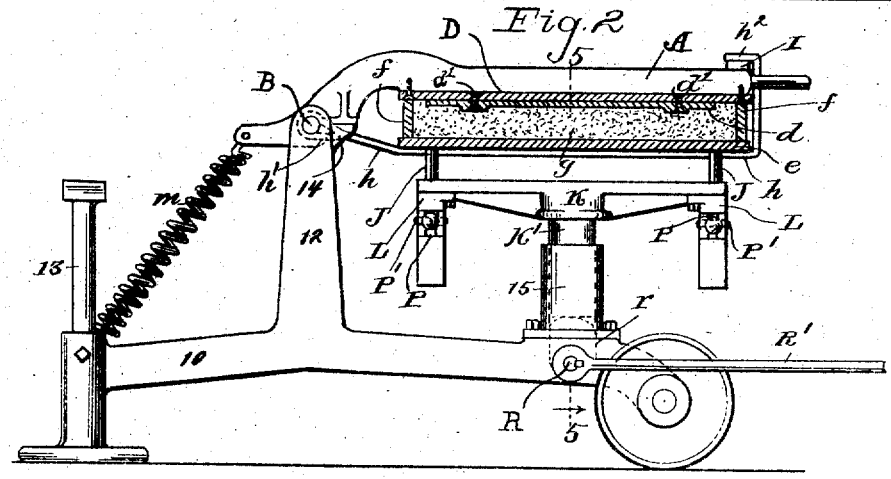
Figure 3:
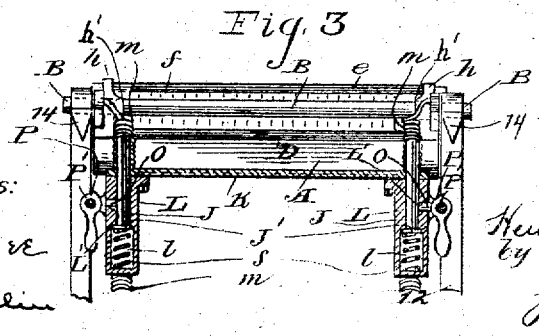
Figure 4:
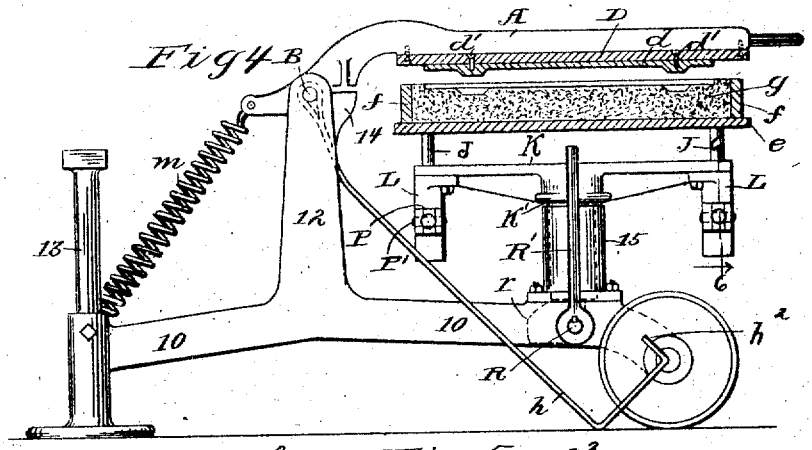
Figure 5:
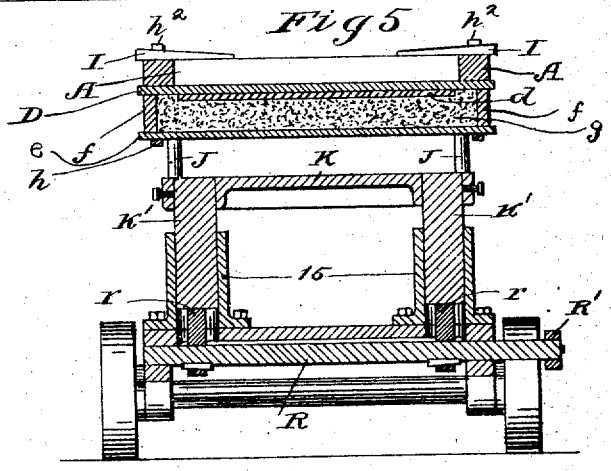
Figure 6:
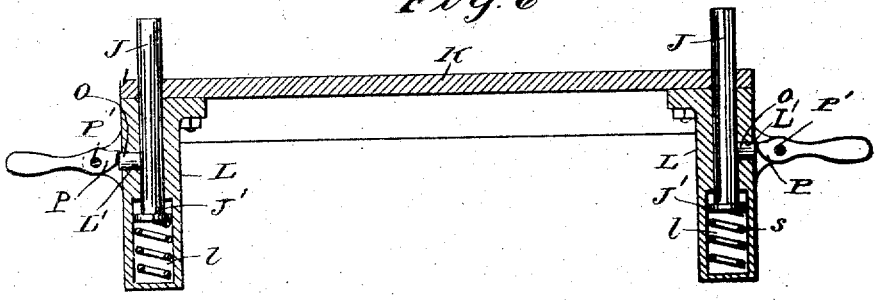

In said drawings, Figure 1, is a side elevation of a mold-making machine embodying my invention, and in this figure the pattern-plate-holder is shown in its mold-receiving position, and the said plate, pattern and mold are shown in section. Fig. 2 is a side elevation of the machine, but in this figure the pattern-plate holder is shown in its mold-delivering position, and the mold, pattern-plate and pattern are shown in section. Fig. 3 is a vertical section on line 3—3, Fig. 1, looking in the direction indicated by the arrow. Fig. 4 is a side elevation, partly in section, showing the pattern-plate-holder in its mold-delivering position and illustrating the lowering or separation of the mold from the pattern of the pattern-plate. Fig. 5 is a section on line 5—5, Fig. 2, looking in the direction indicated by the arrow. Fig. 6 is a vertical section on line 6—6, Fig. 4, looking in the direction indicated by the arrow, but Fig. 6 is drawn on a larger scale.

My improved mold-making machine comprises a pattern-plate-holder formed by a frame A which is pivotally supported at one end and arranged to swing in a vertical plane. Preferably the frame A is journaled at the said end on an axle B which is arranged horizontally and extends between and is supported from two laterally spaced standards 12 which are integral or rigid with and form a portion of the relatively stationary frame-work 10 of the machine. The frame A and any mold formed upon and attached to the frame are capable therefore of being swung in a vertical plane over the axle B. The frame A is provided with a pattern-bearing plate D, hereinafter referred to as the pattern-plate, which is arranged horizontally in its mold-receiving position at one side of the axle, and in the said position of the pattern-plate the frame A rests upon a standard 13 with which the framework 10 is provided, as shown in Fig. 1 and *d* represents the pattern which is removably secured by screws *d'* to the pattern-plate.

The mold is formed on the pattern-plate while the latter is in its mold-receiving position as shown in Fig. 1. The mold comprises a flask *f* and a mold-bottom *e*. The flask *f* is mounted on the pattern-plate when the latter is in its mold-receiving position and then rammed with loam *g* whereupon the mold-bottom *e* is mounted on the flask as shown in Fig. 1. Means for detachably securing the mold to the pattern-plate are provided and may comprise, for instance, two rods $h$. Each rod $h$ is provided at one end with a loop $h'$ loosely embracing the axle B and extending from the axle at one side of the mold across the outer side of the mold-bottom and down the opposite side of the mold and terminating at its free end in a member $h^2$ overlapping the under side of the frame A, and a wedge I driven between the latter and the said member $h^2$ of the rod tightens the mold upon the pattern-plate. The rods $h$ have enough play upon the axle B to render them capable, upon the removal of the wedges I, to be shoved laterally from the mold.

As already indicated, the frame A and attached pattern-plate and mold are arranged at one side of the axis of the said frame in the mold-receiving position of the pattern-plate, and suitably applied spiral springs $m$ are attached at one end to the frame A at the opposite side of the said axis and at their other end to the framework 10 and operate to facilitate the swinging of the frame A and attached mold over the axle and into the mold-delivering position of the pattern-plate, in which position the pattern-plate and attached mold are arranged horizontally at the last-mentioned side of the axis of the said frame, and the standards 12 of the frame-work 10 are provided with lugs 14 which are arranged to form stops for limiting the movement of the said frame in actuating the latter to bring the pattern-plate into its mold-delivering position.

The mold-bottom $e$ during the actuation of the mold-laden pattern-plate into its mold-delivering position comes into contact with the upper ends of several laterally spaced vertically arranged depressible pins or members J which extend through and have lateral bearing in a horizontally arranged head K and extend into and have lateral bearing in correspondingly arranged boxes L which depend from and are attached to and consequently connected together by the said head.

Each box L is provided in its lower end with a chamber $l$ into which extends the pin J which has lateral bearing in the said box, which pin is provided at its lower end with a head J′ which in the upper and normal position of the pin abuts against or engages the top wall of the said chamber, and the said wall and the said head J′ cooperate in preventing upward displacement of the pin, and a spiral spring $s$ is confined within the said chamber between the said head J′ and the bottom of the chamber and acts to retain the pin in its upper and normal position.

Each box is provided in one side thereof with a slot L′ which is loosely occupied by a clamping member O adapted to clamp the pin within the box to the box, and the said box is provided with a manually operated cam P which is pivotally supported, as at P′, from the box and arranged to engage the said clamping member and actuate the latter into its pin-clamping or operative position, as shown in Fig. 6, but normally the said cam and clamping member are in their inoperative position as shown in Figs. 1 and 3.

The head K is rigid with two depending stems or members K′ which are spaced laterally and embraced by correspondingly arranged tubular guides 15 formed on the framework 10 in any approved manner, and the members K′ rest at their lower ends upon the working peripheral surfaces of cams $r$ which are operatively mounted upon a shaft R which is arranged horizontally and supported from the said framework and provided at one end with a lever R′ for turning the shaft.

The operation of my improved mold-making machine is as follows:—The mold, as already indicated, is formed, while the pattern-plate is in its mold-receiving position, and when the mold has been made and removably attached to the pattern-plate, as shown in Fig. 1, the frame A is swung over the axle B (as shown in Fig. 2) into position resting upon the lugs 14 of the standards 12. The pins or depressible members J project normally far enough above the head K to cause them to be depressed by the mold-bottom during the actuation of the pattern-plate into its mold-delivering position so that when the frame A rests upon the lugs 14 all of the pins or depressible members J shall have been lowered against the action of the springs $s$, thereby accommodating any imperfections, irregularities or unevenness in the outer side of the mold-bottom so that the latter, when the said depressible members are locked in their depressed position, can not rock or vibrate. The dotted line 16 in Fig. 1 indicates the extent of depression of the pin members J by the mold-bottom. The pins or depressible members J as soon as they have been lowered against the action of the springs $s$ by the mold-bottom are locked in their depressed position by rendering the clamping members O operative, whereupon the rods or mold-attaching devices $h$ are rendered inoperative by removing the wedges I and withdrawing the said devices laterally from the mold and frame A (as shown in Fig. 4) whereupon the cam-shaft R is turned to permit the head K and attached boxes L to lower by gravity. In other words, it will be seen that by applicant's improvements the mold supporting means, consisting thus of a plurality of normally relatively movable members, may be adjusted to inequalities in the bottom of the mold, while the latter is still supported from the pattern plate holder in the rocked-over position of the latter. This adjustment of the supporting means is effected by having each of said members contact with the mold at one of a series of laterally spaced points preparatory to freeing said mold from a pattern embedded in the material with which the flask of the mold is rammed, and then securing said members against relative movement when in such contacting position, so that any shifting of weights, such as occurs when the mold is freed from the pattern plate, will cause no re-adjustment of position of said members. The members are of course conjointly movable downwardly with the head K when the mold is lowered away from the pattern plate holder, but during such lowering movement their relative positions are strictly maintained, thus preventing any distortion of the mold bottom and flask or injury to the pattern molded in the material within said flask.

What I claim is:—

1. In a mold-making machine, laterally spaced depressible members arranged to be depressed by the mold-bottom during the placing of a mold in position preparatory to freeing the mold from a pattern embedded in the top of the material with which the flask of the mold is rammed; means arranged under the said depressible members and acting to retain the said depressible members in their upper and normal position, and means for locking the said depressible members in their depressed position.

2. In a mold-making machine, laterally spaced depressible members arranged to be depressed by the mold-bottom during the placing of a mold in position preparatory to freeing the mold from a pattern embedded in the top of the material with which the flask of the mold is rammed; springs arranged under the said depressible members and acting to retain the latter in their upper and normal position; supports for the springs, which supports are adapted to be lowered, and means for locking the said depressible members in their depressed position.

3. In a mold-making machine, laterally spaced depressible members arranged to be depressed by the mold-bottom during the placing of a mold in position preparatory to freeing the mold from a pattern embedded in the top of the material with which the flask of the mold is rammed; boxes affording lateral bearing to the said depressible members and arranged a suitable distance below the upper ends of the depressible members; means acting to retain the said depressible members in their upper and normal position; a head supporting the said boxes and adapted to be lowered, and means for locking the said depressible members in their depressed position.

4. In a mold-making machine, laterally spaced depressible members, arranged to be depressed by the mold-bottom during the placing of a mold in position preparatory to freeing the mold from a pattern embedded in the top of the material with which the flask of the mold is rammed; boxes affording lateral bearing to the said depressible members and arranged a suitable distance below the upper ends of the depressible members; springs confined within the said boxes and under the said depressible members and acting to retain the latter in their upper and normal position, and means for locking the said depressible members in their depressed position.

5. In a mold-making machine, laterally spaced depressible members arranged to be depressed by the mold-bottom during the placing of a mold in position preparatory to freeing the mold from a pattern embedded in the top of the material with which the flask of the mold is rammed; boxes affording lateral bearing to the said depressible members and arranged a suitable distance below the upper ends of the depressible members; spiral springs confined within the boxes under the said depressible members and acting to retain the latter in their upper and normal position; a head bearing the said boxes and arranged a suitable distance below the upper ends of the depressible members, which head is adapted to be lowered, and means for locking the depressible members in their depressed position.

6. In a mold-making machine, laterally spaced vertical pins arranged to be depressed by the mold-bottom during the placing of a mold in position preparatory to freeing the mold from a pattern embedded in the top of the material with which the flask of the mold is rammed; means acting to retain the pins in their upper and normal position, and means for locking the pins in their depressed position.

7. In a mold-making machine, laterally spaced upright pins arranged to be depressed by the mold-bottom during the placing of a mold in position preparatory to freeing the mold from a pattern embedded in the top of the material with which the flask of the mold is rammed, which pins are provided at their lower ends with heads; boxes affording lateral bearing to the pins and arranged a suitable distance below the upper ends of the pins, which boxes are provided with chambers whose top walls are engaged by the aforesaid heads in the highest position of the pins; springs confined within the said chambers below the said heads and acting to retain the pins in their upper and normal position, and means for locking the said pins in their depressed position.

8. In a mold-making machine, a suitably guided head normally arranged to be lowered and provided with several laterally spaced depending boxes; depressible members having lateral bearing in the boxes and projecting above the head and normally arranged to be depressed by the mold-bottom during the placing of a mold in position preparatory to freeing the mold from a pattern embedded in the top of the material with which the flask of the mold is rammed; means acting to retain the depressible members in their normal position, and means for locking the depressible members in their depressed position.

9. In a mold-making machine, a horizontally arranged cam-shaft having two corresponding cams spaced longitudinally of the shaft; a head adapted to be lowered and provided with suitably guided depending members resting on and operatively engaged by the cams, which head is provided with several laterally spaced depending boxes; depressible members having lateral bearing in the boxes and projecting above the head and normally arranged to be depressed by the mold-bottom during the placing of a mold in position preparatory to freeing the mold from a pattern embedded in the top of the material with which the flask of the mold is rammed; means acting to retain the depressible members in their normal position, and means for locking the depressible members in their depressed position.

10. A mold-making machine comprising a pattern-plate-holder pivotally supported and arranged to swing in a vertical plane; a pattern-plate secured to the holder and arranged to have the pattern face upwardly or downwardly according as the holder is swung into its mold-receiving or mold-delivering position; means arranged to support the holder and the mold formed down-side upon and attached to the pattern-plate in the mold-receiving position of the plate; means arranged to support the holder in the mold-delivering position of the plate; laterally spaced depressible members arranged to be depressed by the mold-bottom during the actuation of the aforesaid holder into its mold-delivering position; means acting to retain the said depressible members in their upper and normal position, and means for locking the said depressible members in their depressed position.

11. A mold-making machine comprising a frame pivotally supported and arranged to swing in a vertical plane; a pattern-bearing plate secured to the frame and arranged to have the pattern face upwardly or downwardly according as the plate is swung into its mold-receiving or mold-delivering position, means arranged to support the frame and the mold formed down-side upon and attached to the plate in the flask-receiving position of the plate; means arranged to support the frame in position to hold the plate horizontally in the mold-delivering position of the plate; laterally spaced depressible members arranged to be depressed by the mold-bottom during the actuation of the plate into its mold-delivering position; means acting to retain the said depressible members in their upper and normal position, and means for locking the said depressible members in their depressed position.

12. In a mold-making machine, means adapted to support the mold while freeing the same from a pattern in the material with which the flask of the mold is rammed, said means being normally adjustable to unevenness in the mold, and means adapted to retain said first-named means against further adjustment.

13. In a mold-making machine, laterally spaced members normally movable relatively to each other and adapted to support the mold while freeing the same from a pattern in the material with which the flask is rammed, and means adapted to render said members relatively immovable.

14. In a mold-making machine, laterally spaced members normally independently vertically movable and adapted to support the mold while freeing the same from a pattern in the material with which the flask of the mold is rammed, and means adapted to render said members relatively immovable.

15. In a mold-making machine, adjustable means adapted to support the mold in unchanged position, while freeing said mold from a pattern embedded in the material with which the flask of the mold is rammed.

16. In a mold-making machine, a plurality of independently adjustable members each adapted to support the mold at one of a series of laterally spaced points, while freeing said mold from a pattern embedded in the material with which the flask of the mold is rammed.

17. In a mold-making machine, a plurality of independently adjustable members each adapted to contact with the mold at one of a series of laterally spaced points, preparatory to freeing said mold from a pattern embedded in the material with which the flask of the mold is rammed; and means adapted to retain said members in such contacting position under the weight of the mold.

18. In a mold-making machine, laterally spaced depressible members arranged to be depressed by the mold-bottom during the placing of a mold in position preparatory to freeing the mold from a pattern embedded in the material with which the flask of the mold is rammed; means arranged under said depressible members and acting to retain said depressible members in their upper and normal position; and means for retaining said depressible members from depression further than by said mold-bottom.

19. In a mold-making machine, laterally spaced depressible members arranged to be depressed by the mold-bottom during the placing of a mold in position preparatory to freeing the mold from a pattern embedded in the material with which the flask of the mold is rammed; springs arranged under said depressible members and acting to retain the latter in their upper and normal position; supports for the springs, said supports being adapted to be lowered; and means for retaining said depressible members from depression further than by said mold-bottom.

20. In a mold-making machine laterally spaced vertical pins arranged to be depressed by the mold-bottom during the placing of a mold in position preparatory to freeing the mold from a pattern embedded in the material with which the flask of the mold is rammed; means acting to retain the pins in their upper and normal position; and means for retaining said pins from depression further than by said mold-bottom.

21. A mold-making machine, comprising a pattern-plate holder; means arranged to support said holder in the mold-delivery position of the plate; and means adapted to support the mold while freeing the same from the pattern, said supporting means being adjustable to unevenness in the mold so as to thus support the same in unchanged position.

22. A mold-making machine, comprising a pattern-plate holder pivotally supported, and arranged to swing in a vertical plane; a pattern-plate secured to the holder and arranged to have the pattern face upwardly or downwardly according as the holder is swung into its mold-receiving or mold-delivering position; means arranged to support the holder and the mold formed down-side upon and attached to the pattern-plate in the mold-receiving position of the plate; means arranged to support the holder in the mold-delivering position of the plate; and means adapted to support the mold while freeing the same from the pattern, said mold supporting means being adjustable to unevenness in the mold.

23. A mold-making machine, comprising a pattern-plate holder pivotally supported, and arranged to swing in a vertical plane; a pattern-plate secured to the holder and arranged to have the pattern face upwardly or downwardly according as the holder is swung into its mold-receiving or mold-delivering position; means arranged to support the holder and the mold formed down-side upon and attached to the pattern-plate in the mold-receiving position of the plate; means arranged to support the holder in the mold-delivering position of the plate; and laterally spaced movable members adapted to support the mold while freeing the same from the pattern.

24. A mold-making machine, comprising a pattern-plate holder pivotally supported, and arranged to swing in a vertical plane; a pattern-plate secured to the holder and arranged to have the pattern face upwardly or downwardly according as the holder is swung into its mold-receiving or mold-delivering position; means arranged to support the holder and the mold formed down-side upon and attached to the pattern-plate in the mold-receiving position of the plate; means arranged to support the holder in the mold-delivering position of the plate; and members movable independently of each other and adapted to support the mold at laterally spaced points, respectively, while freeing said mold from the pattern.

25. A mold-making machine, comprising a pattern-plate holder pivotally supported, and arranged to swing in a vertical plane; a pattern-plate secured to the holder and arranged to have the pattern face upwardly or downwardly according as the holder is swung into its mold-receiving or mold-delivering position; means arranged to support the holder and the mold formed down-side upon and attached to the pattern-plate in the mold-receiving position of the plate; means arranged to support the holder in the mold-delivering position of the plate; members movable independently of each other and adapted to contact with the mold at laterally spaced points, respectively, in such last-named position of the plate; and means adapted to retain said members in such contacting position to support said mold while freeing the same from the pattern.

26. A mold-making machine comprising a pattern-plate-holder pivotally supported and arranged to swing in a vertical plane; a pattern-plate secured to the holder and arranged to have the pattern face upwardly or downwardly according as the holder is swung into its mold-receiving or mold-delivering position; means arranged to support the holder and the mold formed down-side upon and attached to the pattern-plate in the mold-receiving position of the plate; means arranged to support the holder in the mold-delivering position of the plate; laterally spaced depressible members arranged to be depressed by the mold-bottom during the actuation of the aforesaid holder into its mold-delivering position; means acting to retain said depressible members in their upper and normal position; and means for retaining said depressible members from depression further than by said mold-bottom.

27. A mold-making machine, comprising a pattern-plate holder; means arranged to support said holder in the mold-delivery position of the plate; and a plurality of members adapted to support the mold while freeing the same from the pattern, said members being conjointly movable to lower said mold from the pattern and relatively adjustable to unevenness in the mold so as to support the same in unchanged position pending such lowering.

28. A mold-making machine, comprising a pattern-plate holder pivotally supported, and arranged to swing in a vertical plane; a pattern-plate secured to the holder and arranged to have the pattern face upwardly or downwardly according as the holder is swung into its mold-receiving or mold-delivering position; means arranged to support the holder and the mold formed downside upon and attached to the pattern-plate in the mold-receiving position of the plate; means arranged to support the holder in the mold-delivering position of the plate; and a plurality of members adapted to support the mold while freeing the same from the pattern, said members being conjointly movable to lower said mold from the pattern and relatively adjustable to unevenness in the mold so as to support the same in unchanged position pending such lowering.

29. A mold-making machine, comprising a pattern-plate holder pivotally supported, and arranged to swing in a vertical plane; a pattern-plate secured to the holder and arranged to have the pattern face upwardly or downwardly according as the holder is swung into its mold-receiving or mold-delivering position; means arranged to support the holder and the mold formed downside upon and attached to the pattern-plate in the mold-receiving position of the plate; means arranged to support the holder in the mold-delivering position of the plate; and a plurality of independently adjustable members each adapted to support the mold at one of a series of laterally spaced points while freeing said mold from a pattern embedded in the material with which the flask of the mold is rammed, said members being conjointly movable to lower said mold and thus free the same from the pattern.

30. A mold-making machine, comprising a pattern-plate holder pivotally supported and arranged to swing in a vertical plane; a pattern-plate secured to the holder and arranged to have the pattern face upwardly or downwardly according as the holder is swung into its mold-receiving or mold-delivering position; means arranged to support the holder and the mold formed downside upon and attached to the pattern-plate in the mold-receiving position of the plate; means arranged to support the holder in the mold-delivering position of the plate; a plurality of independently adjustable members each adapted to contact with the mold at one of a series of laterally spaced points preparatory to freeing said mold from a pattern embedded in the material with which the flask of the mold is rammed; and means adapted to retain said member in such contacting position, said members being conjointly movable to lower said mold and thus free the same from the pattern.

Signed by me this 7th day of September 1909.

HENRY M. MOLDER.

Attested by—
ANNA L. GILL,
JNO. F. OBERLIN.